United States Patent [19]

Salvo

[11] 3,900,836

[45] Aug. 19, 1975

[54] INTERLEAVED MEMORY CONTROL SIGNAL HANDLING APPARATUS USING PIPELINING TECHNIQUES

[75] Inventor: George P. Salvo, Poughkeepsie, N.Y.

[73] Assignee: IBM Corporation, Armonk, N.Y.

[22] Filed: Nov. 30, 1973

[21] Appl. No.: 420,492

[52] U.S. Cl. .............................................. 340/172.5

[51] Int. Cl.² .............................................. G06F 9/00

[58] Field of Search..... 340/172.5, 173 FF, 173 RC; 328/55

[56] References Cited

UNITED STATES PATENTS

| | | | |
|---|---|---|---|
| 3,543,243 | 11/1970 | Nordquist | 340/172.5 |
| 3,555,522 | 1/1971 | Martin, Jr. | 340/172.5 |
| 3,585,604 | 6/1971 | Lloyd | 340/172.5 |
| 3,675,216 | 7/1972 | James | 340/172.5 |

*Primary Examiner*—Gareth D. Shaw
*Assistant Examiner*—JOhn P. Vandenburg
*Attorney, Agent, or Firm*—James E. Murray

[57] ABSTRACT

This specification discloses an interleaved memory in which different storage units within the memory can be operated in overlapping operating cycles to increase the apparent speed of the memory. These storage units each have a separate ring counter that is started when the particular storage unit is first accessed. The ring counter generates gating and drive pulses for the accessed storage unit at times consistent with the proper operation of that storage unit. The data to control the function performed by the memory is fed into shift registers operated in synchronism with the ring counters. In this way the data is accessible at different times at different locations along the length of the shift registers so that it is available to direct the functioning of the storage unit at times determined by the generation of the gating and timing pulses by the ring counter.

4 Claims, 7 Drawing Figures

INTERLEAVED MEMORY CONTROL SIGNAL HANDLING APPARATUS USING PIPELINING TECHNIQUES

BACKGROUND OF THE INVENTION

Interleaving is a very desirable feature in memories since it makes a memory seem faster to the accessing devices than it really is. However, a memory that employs interleaving requires a significant amount of logic primarily in the form of latches to store the various control signals used to access the interleaved memory and also requires precise clocking to control the functioning of the mentioned latches so as to make the information available to the right section of the memory at the proper point in its operating cycle.

SUMMARY OF THE PRESENT INVENTION

In accordance with the present invention, the amount of hardware required to control the memory and the complexity of the clocking of the memory is reduced by using pipelining techniques. Pipelining is a known design technique which separates logical design with registers. Here the latches used to store the control information for the memory are arranged in pipelines or shift registers where the information moves from latch to latch of the shift registers in synchronism with the operation of ring counters used to generate the gating and drive signals for the memory and is available for logical decision making at some latch location when the memory is ready to perform a particular function.

Therefore, it is an object of the present invention to simplify the logic needed to operate a memory system.

Another object of the present invention is to simplify the logic and clocking in interleaved memory systems.

It is another object of the present invention to employ pipelining to simplify the logic and clocking in an interleaved memory system.

The foregoing and other objects, features and advantages of the present invention will be apparent from the following description of a preferred embodiment of the invention as illustrated in the accompanying drawings, of which:

DETAILED DESCRIPTION

Figure 1A:
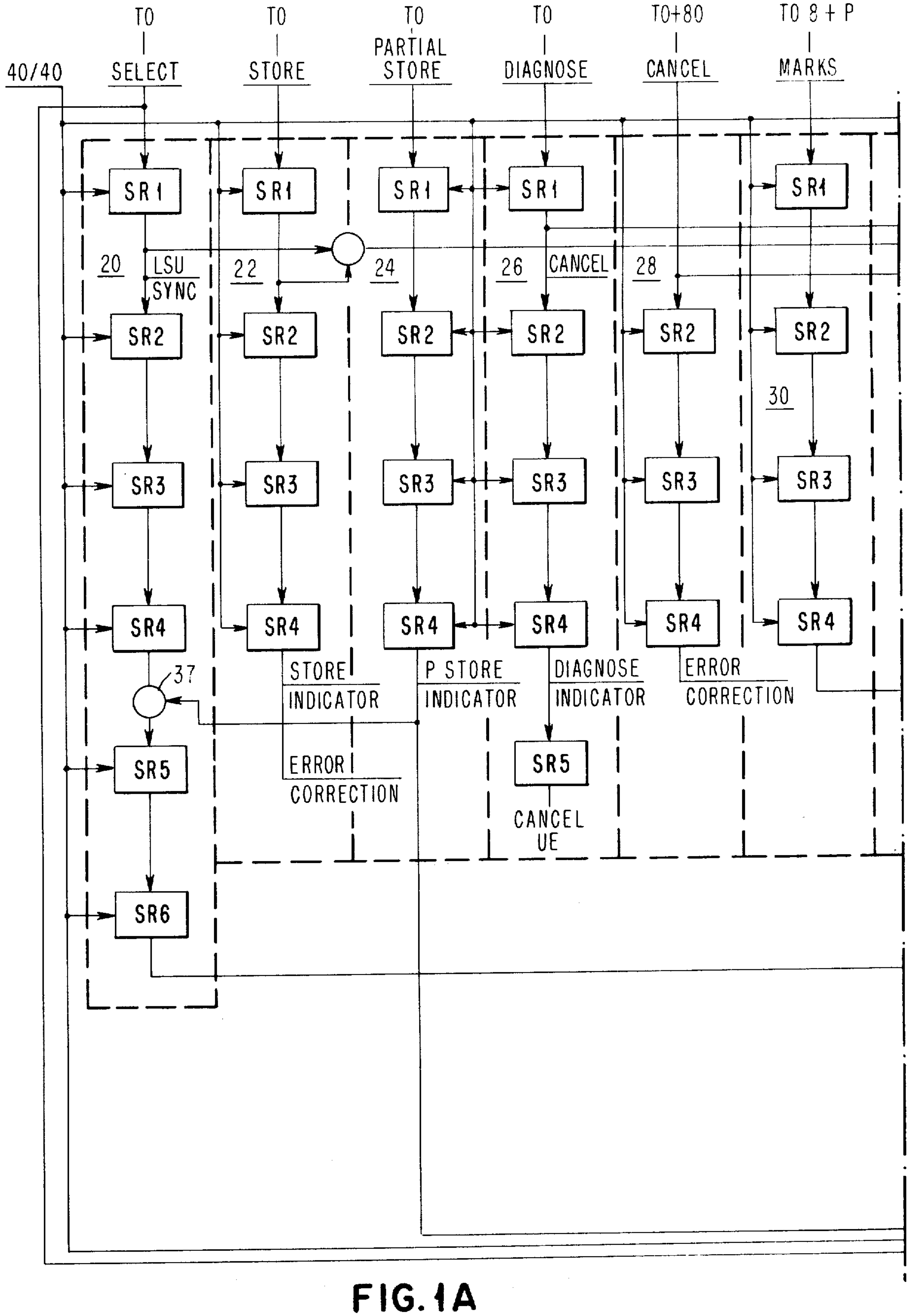
FIGS. 1*a* and 1*b* are a schematic diagram of the system employing the present invention.
Figure 1B:
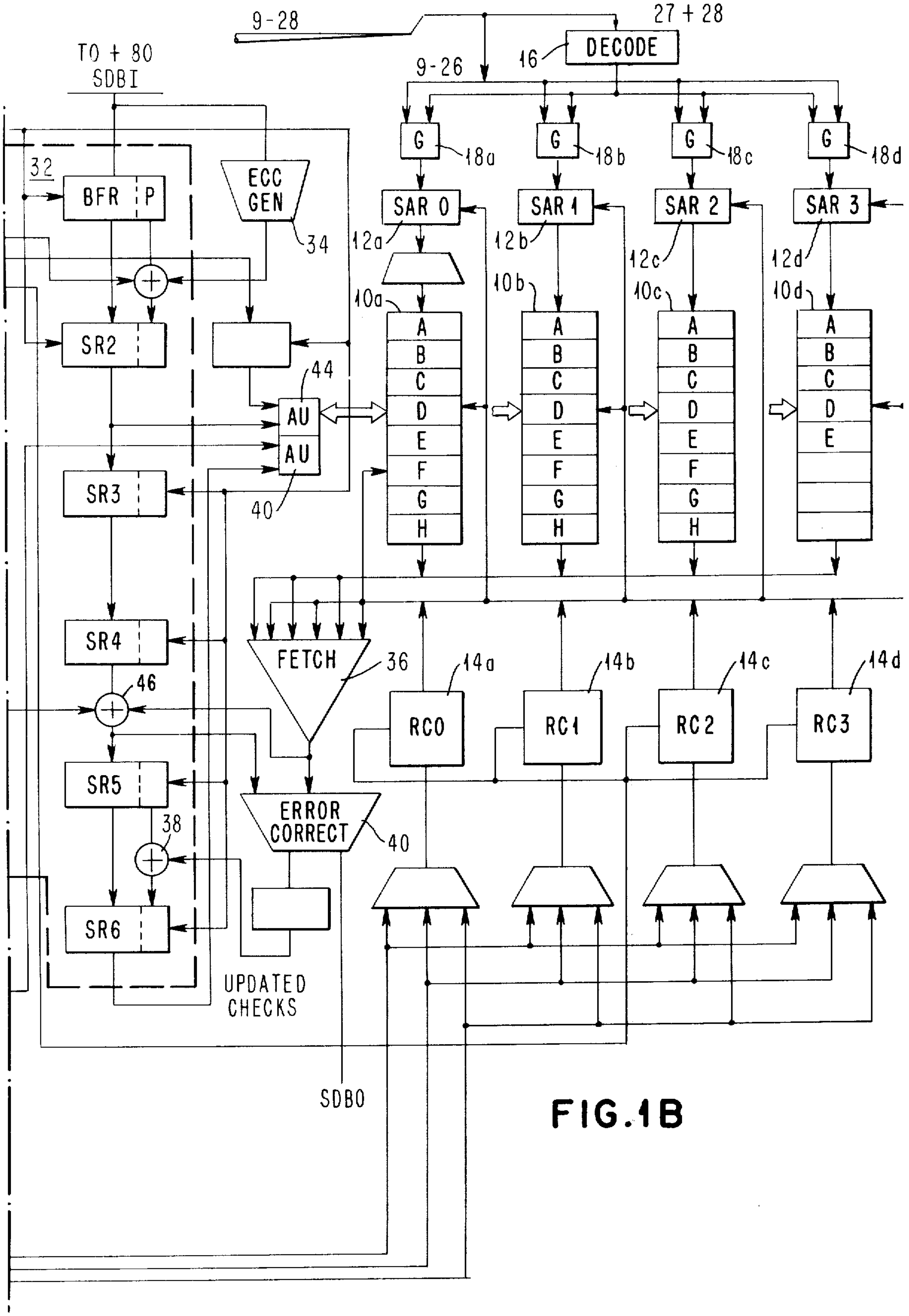

Referring now to FIG. 1, the storage unit comprises four separate logical storage units of LSU's 10 each having its own storage register or SAR 12 and ring counter 14. Each of the logical storage units contains eight data segments A through H of a quarter of million bits of data each. The LSU's 10 can be accessed at 80 nanosecond intervals by address bits 9 through 28 supplied in parallel to the storage unit by the CPU. Bits 27 and 28 are decoded in decoder circuit 16 to supply an actuating signal for one of the gates 18 to select the particular logical storage unit being addressed. Bits 8 through 11 then select the particular segment within the logical storage unit being addressed while the remainder bits access a seventy-two bit portion of data within the selected segment. This seventy-two bit portion of data comprises two words comprising sixty-four data bits and eight ECC check bits.

The gating and drive signals used in the logical storage units 10 are generated by ring counters 14 which are driven by a clock signal (40/40) from the CPU having a period of 80 nanoseconds divided equally between up and down levels. Each ring also receives one bit of a four-bit select signal from the CPU to determine which of the LSU's will be accessed during any 80 nanosecond period of the clock. The select signal comprises three binary "0's" and a binary "1". The ring 14 receiving the binary 1 signal is the ring for the selected logical storage unit. The other rings receiving the binary 0's are for the unselected storage units.

Figure 2:
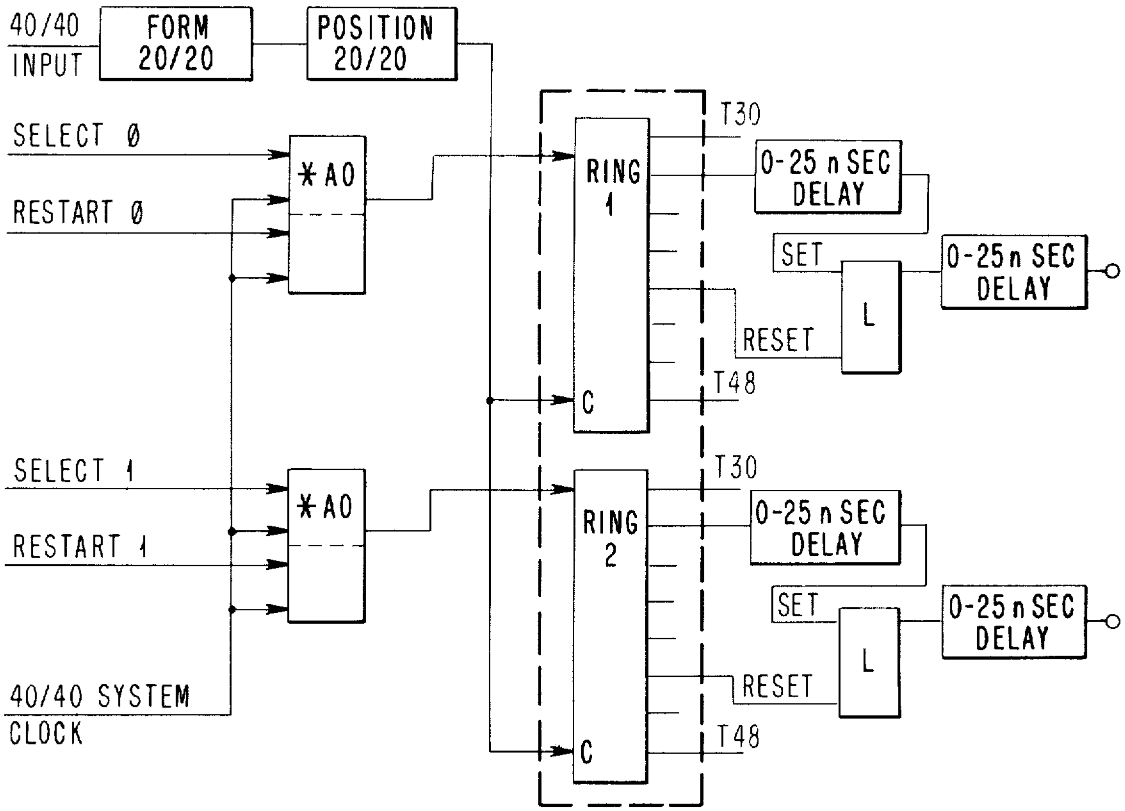
FIG. 2 is a logic diagram of the ring counters shown in FIG. 1.
Figure 3:
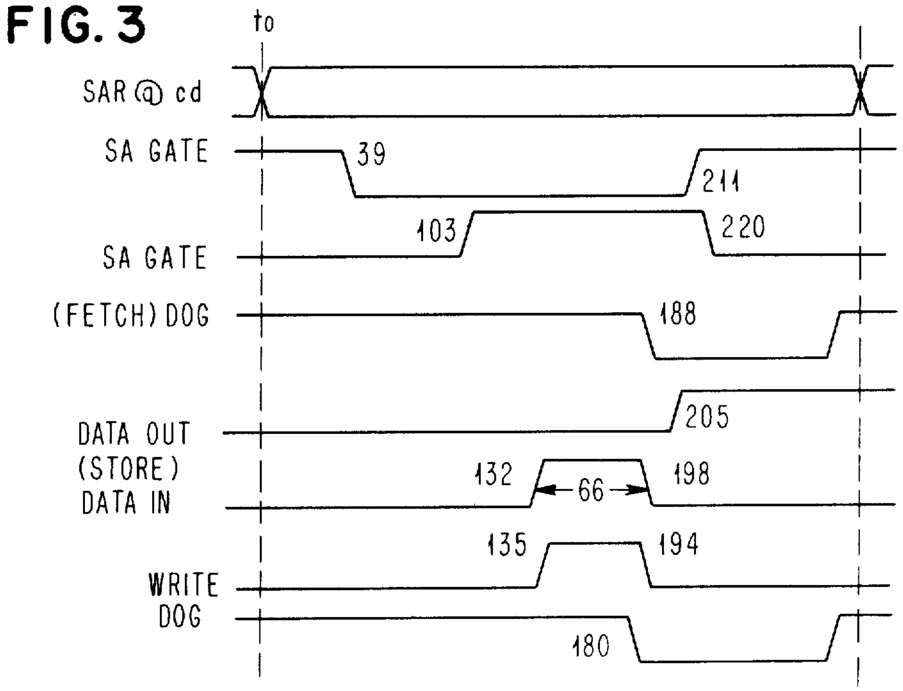
FIG. 3 is a set of output pulses from the ring counters shown in FIG. 2.

The ring is illustrated in FIG. 2. It is a straightforward ring circuit. It produces a 40 nanosecond pulse at each of its outputs at 20 nanosecond intervals. These pulses are fed through latches to generate the various signals used in the memory system such as those shown in FIG. 3. Each latch receives a set input from one of the outputs of the ring and a reset input from an output further down the ring so that it will produce the desired pulse at the desired time.

To control the transfer of data between the storage unit and the CPU a storage distribution element SDE is provided. The SDE provides the ECC logical data and addressing and timing control signals to support the storage. In accordance with the present invention the SDE is designed using pipelining techniques. Pipelining is a known design technique which separates logical operations with registers. Using this technique in the SDE allows the clocking and control data to move down the pipeline at some harmonic of half the storage select rate (80 nanoseconds) and be available for logical decision making at selected times and different locations along the pipelines. Data coincidence of logical operations involving two or more pipelines is easily accomplished by adjusting the clocks feeding the registers involved.

Figure 4:
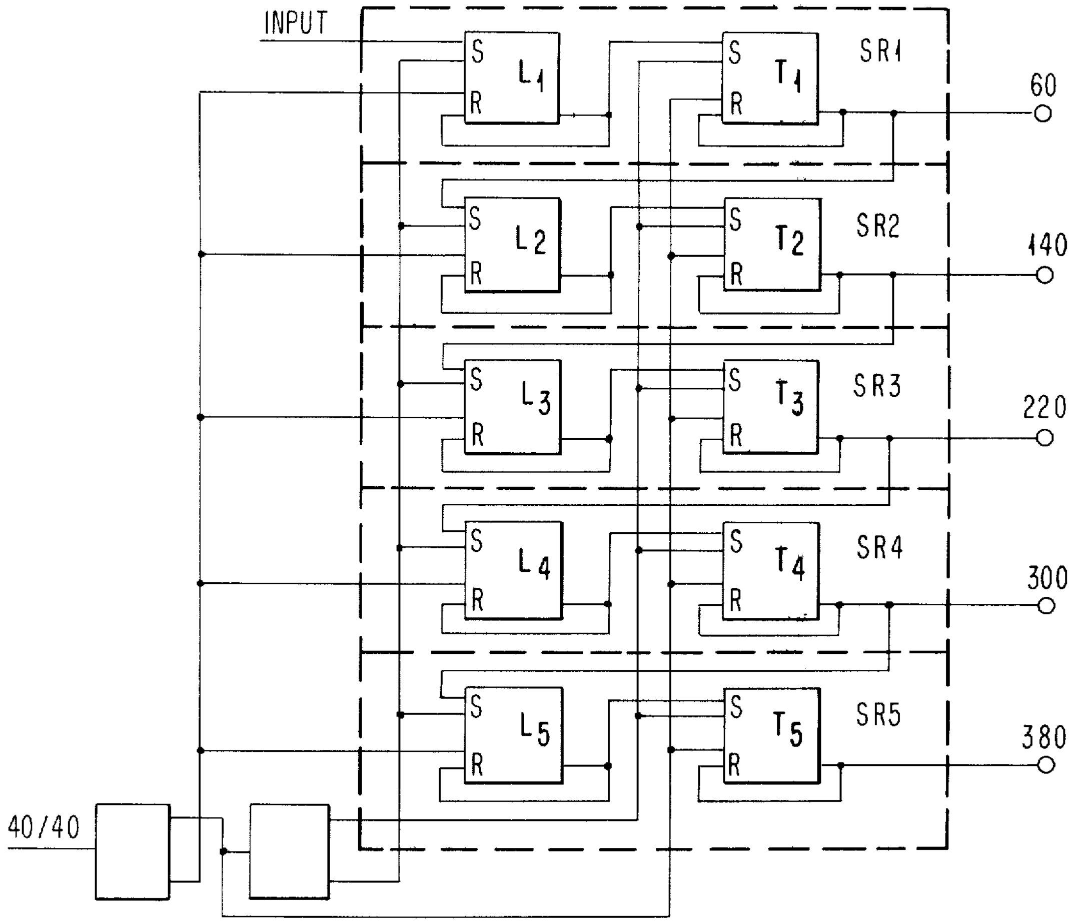
FIG. 4 is a typical shift register pipeline used in the circuit of FIG. 1.

A single digit pipeline is illustrated in FIG. 4. As can be seen in this figure, the pipeline consists of a plurality of two position shift registers SR, each having two latches with the input of the second latch being fed by the first latch and the output of the second latch feeding the input of the first latch on the next stage. The first stage L of the register SR1 receives the input signal from the CPU and the second stage T of each of the registers provides the latch data at its output at a preset interval after the data appears at the output of the stage before it and prior to the appearance of the data at the output of the stage after it. As shown, these pipelines operate off the same 40 × 40 clock as the ring counters 14 so that the data supplied to the inputs of the pipelines will be stepped along in the pipeline in synchronism with the operation of the storage unit.

Referring back to FIG. 1, a plurality of these pipelines is seen, each pipeline capable of handling one or more digits. The pipelines for handling more than one digit are a number of the single digit pipelines shown in FIG. 4 in parallel. The first pipeline 20 is a four-digit pipeline that receives the four select pulses mentioned previously in connection with the ring counters. A second pipeline 22 receives a single bit to indicate whether a store operation is to be performed by the memory or not. A 1 here indicates that a store operation is to be performed. The next column is another single digit pipeline 24 which receives a partial store indication from the CPU. A 1 sent to this pipeline by the CPU indicates that a partial store operation is to be performed. If a select signal is provided to the first pipeline 20 a 0 is supplied to both the second and third pipelines 22 and 24, and a fetch or read operation is to be performed.

The next three pipelines 26, 28 and 30 contain a diagnostic bit, a cancel bit, and mark bits. The first two pipelines are single bit pipelines which contain signals that may require the data requested to be aborted. The next pipeline 30 accepts 9 bits in parallel, 8 bits for indicating which byte or bytes in a word are to be changed during a partial store operation and the ninth bit being a parity bit of the other eight. If there is a 1 in any one of the first eight mark bit positions that byte in the word is to be changed. Thus, if there is a 1 in the first mark bit position, the first byte is then to be changed by the partial store and if there is a mark in the first and second mark bit positions, then the first and second bytes of the word are to be changed, and so on.

The next pipeline 32 is that which receives the data to be entered into the storage. This is seventy-two bits wide to accept the sixty-four bits of the word plus eight bits generated by the error correction code generator 34.

Figure 5:
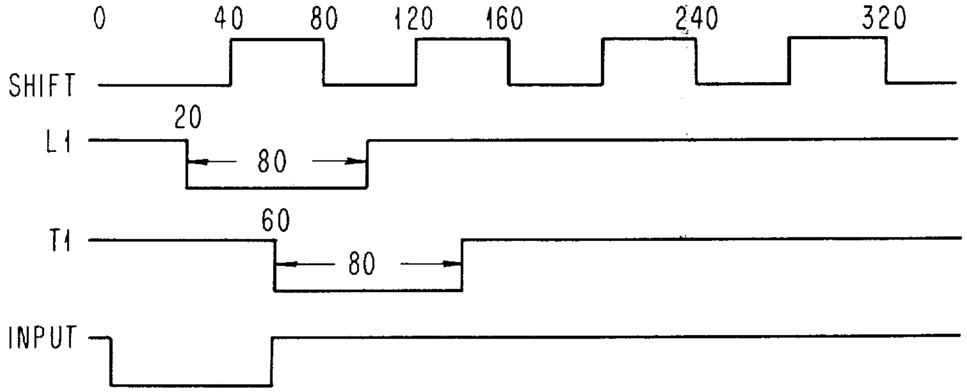
FIG. 5 is a series of input and output waveforms on the shift register pipeline shown in FIG. 4.
Figure 6:
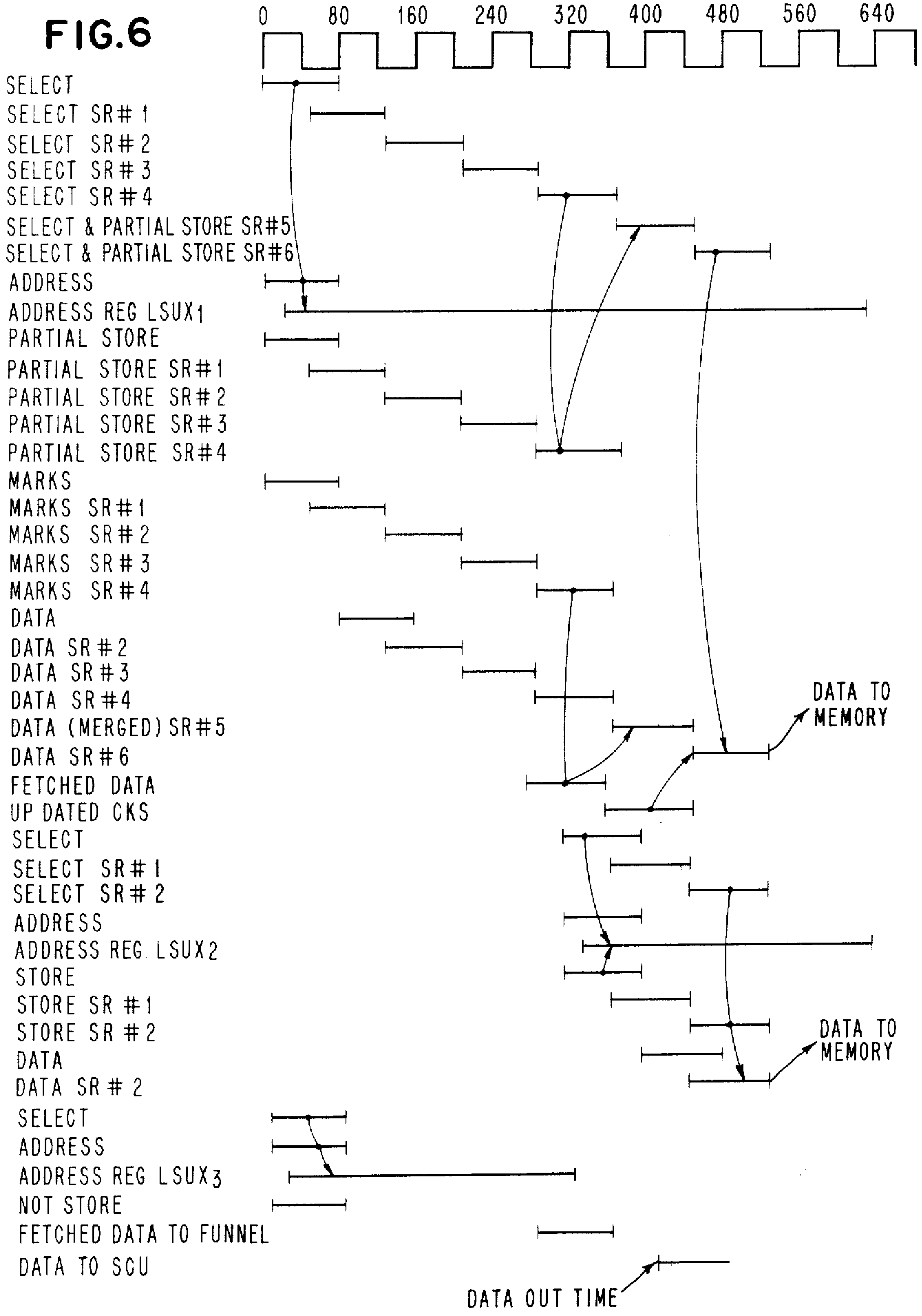
FIG. 6 is a timing diagram showing the operation of the circuit of FIG. 1 as it performs a store, a partial store and a fetch operation.

We will now describe the operation of the circuit of FIG. 1 in connection with store, partial store and fetch operations. First, a partial store operation will be described, then a store operation and, finally, a fetch operation. The partial store will take place in LSU 10*a*. At time T0, the CPU provides the address bits 9 – 28. Bits 27 and 28 are decoded to select the SAR 12*a* and bits 9 – 26 are then fed into the SAR 12*a*. As shown in FIG. 5, the four select bits, the partial store bit, and the nine mark bits are supplied to the memory along with the address at time T0. As pointed out previously, the select bits are used to start the clock for LSU 10*a* to generate the clock pulses for the LSU 10*a*. One of these pulses readies the SAR 12*a* to accept the address. Also, at time T0 the select, partial store and mark bits are fed into pipelines 20, 24 and 30, respectively. As can be seen from FIG. 1 the select, partial store and mark bits for the partial store operation proceed through the steps of the pipeline in sequence, the first through SR1, then SR2, and so on under the sequencing of the 40 × 40 main data clock pulse.

At time T0 plus 80, data is put into pipeline 32 where ECC bits are added to it and fed into SR 2. The data then proceeds in pipeline 32 in parallel with the select bits in pipeline 20, partial store bit in pipeline 24, and the mark bits in pipeline 30 until the output of SR 4. At that time the fetch pulse produced by the ring counter allows data in the LSU 10*a* to be read out of the fetch decoder 36 and fed into a gate circuit 32 consisting of an AND gate for each of the bits. At the same time, the data exiting from SR 4 in pipeline 32 enters a similar gate. Each of the AND gates receiving a bit from the fetch decoder 36 also receives the inverse of one of the eight mark bits. Each of the AND gates receiving a bit from SR 4 also receives one of the eight mark bits. Thus, any byte having a 1 in this mark bit position allows the data from SR 4 to enter SR 5 and any byte with a 0 bit in its mark position permits that byte in SR 4 to enter the SR 5. Therefore, at this point merging the data from LSU 10*a* with the data being entered in this partial store operation is accomplished so that the new data from the partial store is contained in SR 5. Also, at SR 4 output time the partial store signal is fed to ring counter 14*a* to restart the ring counter and is fed into AND circuit 38 to permit the select signal to enter SR 4 in pipeline 20.

Because the data in the word has been changed, the error correction bits must be updated. This is done in ECC check bit generator circuit 40 and the results fed into SR 6 along with the data bits of the double word. At SR 6 output time the output of pipeline 20 containing the select bits is fed into the AND gate 40 simultaneously with the output of SR 6 in pipeline 32. There is a series of AND gates for each of the LSU's 10*a* – 10*d*. However, only the LSU 10*a* receives the data since its AND gates are the only ones open by a 1 select signal.

At T0 plus 320 nanoseconds a store and select digits are applied to pipelines 20 and 22 to effect a store on LSU 10*d*. Again, simultaneously with the select pulse an address is supplied to the SAR 10*d*. The select causes the ring counter 10*d* to start upon the application of the positive-going portion of the 40 nanosecond pulse, opening the address register to accept address bits. At time T0 plus 400 data enters pipeline 32 and ECC digits are generated in ECC generator 32 and the address plus the ECC bits are placed into shift register SR 2. Also, the output of SR 1 in pipeline 20 and SR 1 in pipeline 22 are ANDed, fed to a delay and passed into AND gate 44 simultaneously with the appearance of the stored data at the output of SR 2. AND gate 44, like AND gate 40, is a series of four sets of AND gates, one for each of the LSU's 10*a* – 10*d*. Each of these AND gates receives one digit of the seventy-two bit word and one of the select digits. Only the gates to LSU 10*d* are open since that is the only one receiving a 1 digit from the select pipeline 20. Thus, the data is entered into the LSU 10*d* at time 510 nanoseconds simultaneously with the data entering LSU 10*a* so that a partial store and a store operation can be simultaneously applied to the LSU's without conflict with this scheme.

The final operation to be described is a fetch operation. Here select and address pulses are received at time T0 and through the operation of the ring counter for LSU 10*c*. This causes the SAR 12*c* to transmit the address of the requested data to SCU 10*c*. When the fetched data reaches a select decoder a pulse from the ring counter passes the data out at T0 plus 400 nanoseconds.

While the invention has been particularly shown and described with reference to a preferred embodiment thereof, it will be understood by those skilled in the art that the above and other changes in form and details may be made therein without departing from the spirit and scope of the invention.

What is claimed is:

1. In an interleaved memory having a plurality of storage units each of which internally uses a plurality of timed operating pulses that are generated by a separate ring counter driven by a clocking source which determines the intervals at which the storage units can be operated, an improved storage control unit comprising:

a. a plurality of multi stage shift registers driven by said clocking source for receiving control information for instructing the memory to perform either a fetch, store or partial store operation;

b. means for supplying a control signal to at least the ring counter supplying operating pulses to the storage unit of interleaved memory being accessed and to the shift registers to start the ring counter and the shift registers so that as a result of the shift registers being driven by the same clocking source as the ring counter the shift registers and ring counter operate in synchronism; and c. logic means coupling inputs of the memory units to selected stages in first plurality of shift registers for generating control signals that permit the passage of data into the accessed memory unit only at those times that the control signals generated from the control information in the selected stages of the plurality of shift registers indicates data should be entered into the accessed memory unit of the interleaved memory to perform one of the fetch, store or partial store operations.

2. The memory of claim 1 wherein said plurality of shift registers includes three shift registers each storing one binary digit in each stage thereof, wherein: the first shift register stores a select digit indicating the selection of one of the memory units for accessing when a binary 1 is stored therein; the second shift register stores a store digit indicating the performance of a write operation is to be performed when a binary 1 is stored therein; the third digit stores a partial store digit indicating only part of the data has to be rewritten during the store operation when a binary 1 is stored therein; and the three shift registers together indicate a write operation is to be performed when there is a binary 1 stored in any given stage of the first shift register and a binary 0 stored in the corresponding stages of the second and third shift registers.

3. The memory of claim 2 wherein said plurality of shift registers includes additional shift registers, the first two of which store data indicating that the operation performed by the memory as controlled by the data in the corresponding stages of said three shift registers may have to be aborted and the remainder of said additional shift registers indicating which bytes are to be written into the memory during a partial store operation.

4. The memory of claim 2 including first logic means to feed the selection digits to the ring counter of the selected storage unit during one time period; and second logic means coupling an intermediate output of the shift registers receiving the select signals to the input of the storage units to control which of the storage units receives the data on a store and partial store operation.

* * * * *